United States Patent

Reinholz

[11] Patent Number: 5,813,703
[45] Date of Patent: Sep. 29, 1998

[54] CONNECTOR FOR HOSES

[75] Inventor: Antonio Carlos Reinholz, Sao Paulo, Brazil

[73] Assignee: Tampas Click Para Véiculos Indústria E Comércio Ltda., Sao Paulo, Brazil

[21] Appl. No.: 807,051

[22] Filed: Feb. 26, 1997

[30] Foreign Application Priority Data

Feb. 26, 1996 [BR] Brazil .................................. 9600812-1

[51] Int. Cl.[6] ...................................................... F16L 43/02
[52] U.S. Cl. ........................... 285/179; 285/239; 285/305; 285/423
[58] Field of Search .................................. 285/305, 179, 285/239, 423

[56] References Cited

U.S. PATENT DOCUMENTS

| | | | |
|---|---|---|---|
| 5,542,716 | 8/1996 | Szabo et al. ............................. | 285/305 |
| 5,586,792 | 12/1996 | Kalahasthy et al. ................. | 285/305 X |
| 5,593,187 | 1/1997 | Okuda et al. ............................ | 285/305 |
| 5,607,192 | 3/1997 | Lee ......................................... | 285/305 |

*Primary Examiner*—Dave W. Arola
*Attorney, Agent, or Firm*—Steinberg & Raskin, P.C.

[57] ABSTRACT

A connector for connecting a pair of hoses including a unitary body having a substantially cylindrical main section having a hollow interior, a projection extending outward from the main section and connectable to a first hose, a first edge portion extending outward from the main section, a second edge portion extending outward from the main section at a distance from the first edge portion to define a space therebetween, and a rim defining an aperture through which a second hose is insertable into the interior of the main section. The projection has a hollow interior in flow communication with the interior of the main section. The connector also includes a locking device arranged in the space between the first and second edge portions for locking the second hose in connection with the main section.

11 Claims, 2 Drawing Sheets

CONNECTOR FOR HOSES

FIELD OF THE INVENTION

The present invention relates to a connector for hoses, in particular vehicular hoses, such as for example fuel hoses, which provides mechanical resistance to mechanical forces as well as resistance to exposure by chemicals, i.e., chemical degradation. The vehicular hose connector also enables a rapid installation of the hose into connection therewith, preferably while avoiding the use of tools.

OBJECT AND SUMMARY OF THE INVENTION

It is an object of the present invention to provide a new and improved connector for hoses for vehicles.

It s another object of the present invention to provide a new and improved connector for hoses which provides adequate resistance to mechanical separation forces as well as resistance to chemical degradation.

In order to achieve these objects and others, the hose connector in accordance with the invention comprises a body portion having a tubular projection portion with external scales onto which a hose is mounted while an opposite end of the body portion of the connector has a receptacle for receiving another hose and locking means for locking the second hose in connection with the connector. The locking means is also termed braking means because it brakes or prevents the movement of the hose from disengagement with the connector and maintains the hose in a secured connection with the connector.

One particular construction of the locking means is a brake which operates under pressure against the hose and is disposed between two flanges provided on the connector in the vicinity of the end of the connector to which the hose is attached. The brake has a hose-actuation opening in the region where it is actuated.

In one embodiment of the invention, the connector comprises a unitary body including a substantially cylindrical main section having a hollow interior, a projection extending outward from the main section and connectable to a first hose (and having a hollow interior in flow communication with the interior of the main section), a first edge portion extending outward from the main section, a second edge portion extending outward from the main section at a distance from the first edge portion to define a space therebetween, and a rim defining an aperture through which a second hose is insertable into the interior of the main section. The connector also includes locking means arranged in the space between the first and second edge portions for locking the second hose in connection with the main section. The main section may comprise positioning means for positioning the second hose in the interior of the main section, e.g., a circumferential, inwardly directed projection. The locking means may comprise a unitary, elongate member having first and second ends, the first end having outwardly extending projections. The member defines an aperture having a first substantially circular portion proximate the second end and a second portion extending in a direction toward the first end, the second portion having a curvature facing the second end. The member is positioned in the space between the first and second edge portions in engagement with the second hose to secure the second hose relative to the connector.

BRIEF DESCRIPTION OF THE DRAWINGS

The following drawings are illustrative of embodiments of the invention and are not meant to limit the He of the invention as encompassed by the claims.

DETAILED DESCRIPTION OF THE PREFERRED EMBODIMENTS

Figure 1:
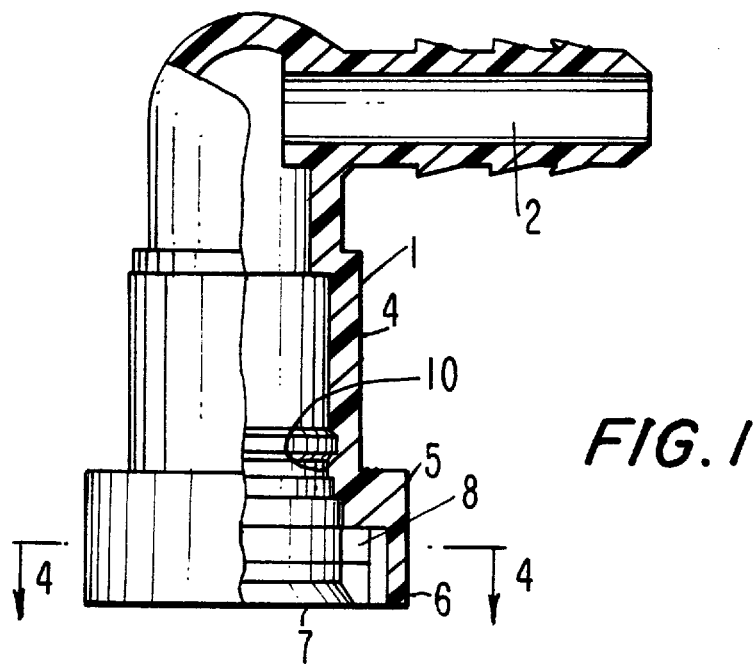
FIG. 1 shows a partial sectional side view of the connector in accordance with the invention.
Figure 2:
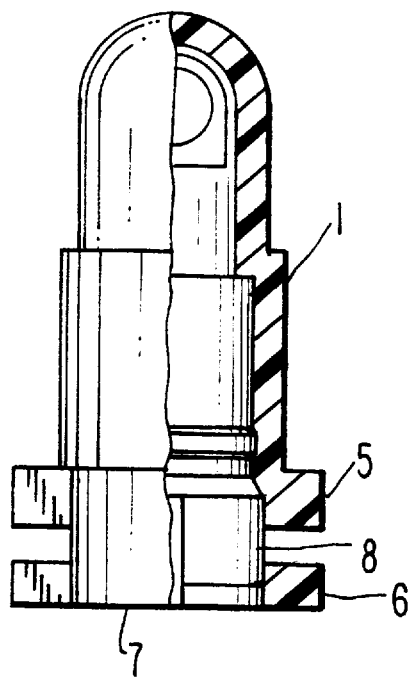
FIG. 2 shows a partial sectional front view of the connector in accordance with the invention.
Figure 3:
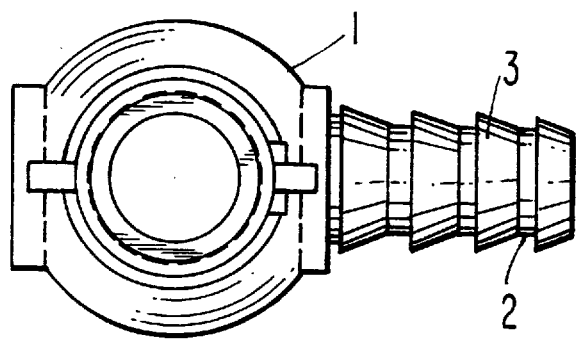
FIG. 3 shows a bottom view of the connector in accordance with the invention.
Figure 4:
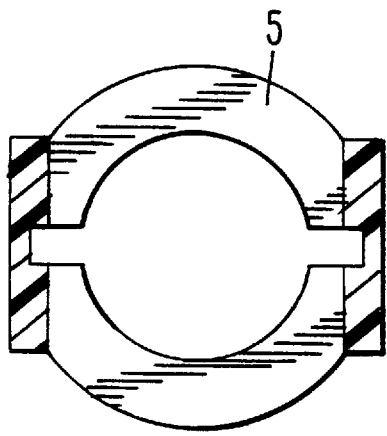
FIG. 4 shows a view of the connector in accordance with the invention taken along the line 4—4 in FIG. 1.
Figure 5:
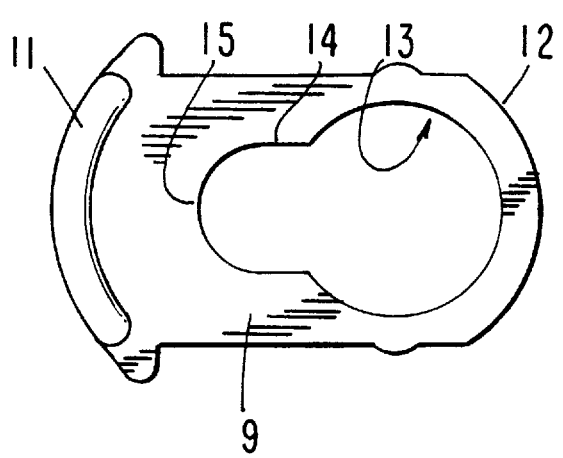
FIG. 5 is a top view of the lock in the connector in accordance with the invention.

Referring to the accompanying drawings wherein the same referenced numerals refer to the same or similar elements, FIG. 1 shows a connector which has a unitary body 1 having a side projection 2 extending from a top region thereof, i.e., in a substantially perpendicular direction thereto as shown, and externally provided with scale-shaped projections 3. The projection 2 is adapted to receive a hose in a secure relationship, which directly engages with the projections 3 on the external surface thereof. The projection 2 is able to receive any conventional hose such as a substantially cylindrical rubber hose which is a common form of a fuel hose. The projection 2 is hollow and communicates with the hollow interior of the body 1 to provide a flow connection. The body 1 is provided with a thickened, central region 4 while its base has two edges 5 and 6, the second edge 6 being closer to a connector rim 7 arranged at the base of the body 1. Connector rim 7 defines an aperture through which a second hose, e.g., a conventional hose such as a substantially cylindrical rubber hose which is a common form of a fuel hose is insertable into connection with the connector. The body 1 also includes a space or aperture 8 defined between the edges 5,6 on the body 1. Locking means for locking the hose in the aperture 8 are shown in FIG. 5 and cooperate with the body 1. The body 1 also includes internally and on a surrounding region of edge 5, an inwardly directed projection 10, e.g., for positioning the hose in a specific location relative to the connector.

The lock 9 as shown in FIG. 5 is formed by an elongated unitary annular body provided with projections 11 on one end and a substantially circular hole 13 positioned in a middle region proximate the other end, which is defined by a rim 12. The circular hole 13 connects with a bulging portion 14, having the approximate shape of a rectangle but with a smaller size that the size of the hole 13, which is arranged on a side of the hole 13 opposite the rim 12. The segment 15 of the lock 9 defining the bulging portion 14 which faces the rim 12 is curved.

The lock or locking device 9 which acts on the connector allows a vigorous pressing position of the hose to the connector on the lock application region only through the displacement of the related lock 9, which includes an aperture having a large segment and a smaller segment as shown in FIG. 5. In this manner, the larger portion of the aperture allows the hose positioning and the smaller portion of the aperture adjusts the hose to its suitable position. In this regard, the connector may be made of a flexible material while the lock 9 is positioned around the portion of the connector between the edges 5,6 and is adapted to press the connector around the hose in its interior.

This construction in accordance with the invention provides a small-sized, safe, rapidly connectable connector which permits assembly thereof to different access locations, besides allowing the assembly to be assembled without the use of tools due to the existence of the locking device.

The examples provided above are not meant to be exclusive. Many other variations of the present invention would be obvious to those skilled in the art, and are intended to be within the scope of the appended claims.

I claim:

1. A connector for connecting a pair of hoses, comprising, a unitary body including a substantially cylindrical main section having a hollow interior and a substantially cylindrical outer surface, a projection extending outward from said substantially cylindrical outer surface of said main section in a substantially perpendicular direction to said substantially cylindrical outer surface and connectable to a first hose, said projection having a hollow interior in flow communication with said interior of said main section, a first edge portion extending outward from said main section, a second edge portion extending outward from said main section at a distance from said first edge portion to define a space therebetween, and a rim defining an aperture through which a second hose is insertable into said interior of said main section; and locking means arranged in said space between said first and second edge portions for locking the second hose in connection with said main section.

2. The connector of claim 1, wherein said projection has external scale-shaped projections directly engageable with the first hose.

3. The connector of claim 1, wherein said main section further comprises positioning means for positioning the second hose in said interior of said main section.

4. The connector of claim 3, wherein said positioning means comprise a circumferential, inwardly directed projection.

5. The connector of claim 1, wherein said locking means comprise a unitary, elongate member having first and second ends, said first end of said member having outwardly extending projections, said member defining an aperture having a first substantially circular portion proximate said second end and a second portion extending in a direction toward said first end, said second portion having a curvature facing said second end, the second hose situated in said aperture.

6. The connector of claim 1, wherein said locking means is arranged around the entire circumference of said cylindrical main section in said space between said first and second edge portions.

7. A connector for connecting a pair of conventional hoses, comprising, a unitary body including a substantially cylindrical main section having a hollow interior, a projection extending outward from said main section and connectable to a first hose, said projection having a hollow interior in flow communication with said interior of said main section, a first edge portion extending outward from said main section, a second edge portion extending outward from said main section at a distance from said first edge portion to define a space therebetween, and a rim defining an aperture through which a second hose is insertable into said interior of said main section; and locking means arranged in said space between said first and second edge portions for locking the second hose in connection with said main section, said locking means comprising a unitary, elongate annular member having first and second ends, said first end of said member having outwardly extending projections, an aperture being formed in said member, said aperture having a first substantially circular portion proximate said second end and a second portion extending in a direction toward said first end, said second portion having a curvature facing said second end, the second hose situated in said aperture.

8. The connector of claim 7, wherein said unitary member of said locking means is arranged around the entire circumference of said cylindrical main section in said space between said first and second edge portions such that said cylindrical main section is situated inside of said aperture.

9. The connector of claim 7, wherein said projection has external scale-shaped projections directly engageable with the first hose.

10. The connector of claim 7, wherein said main section further comprises positioning means for positioning the second hose in said interior of said main section.

11. The connector of claim 10, wherein said positioning means comprise a circumferential, inwardly directed projection.

* * * * *